Dec. 3, 1963 — E. M. KNIGHT — 3,112,716
FIRE STARTER FOR OUTSIDE GRILLS
Filed Dec. 1, 1960
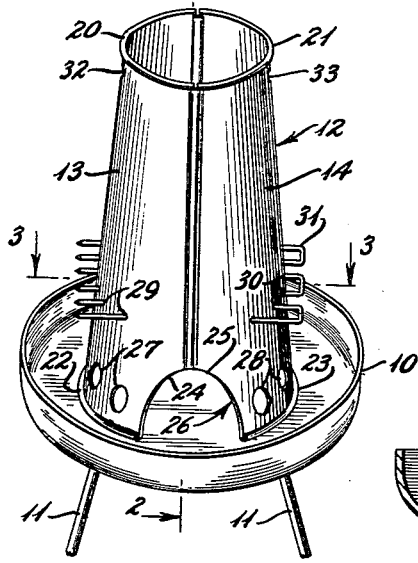
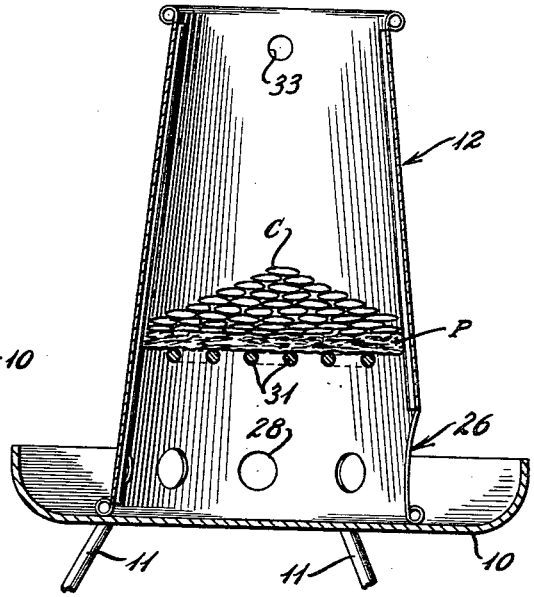
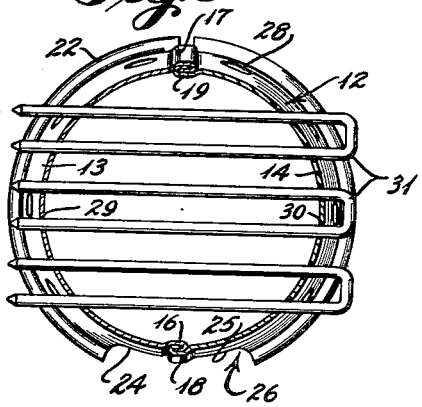
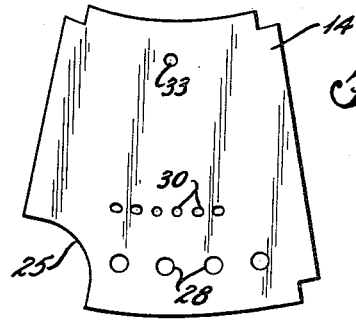
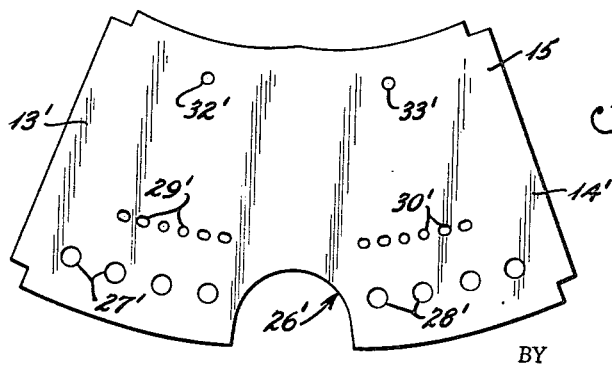
INVENTOR
Edward M. Knight
BY
ATTORNEY

United States Patent Office 3,112,716
Patented Dec. 3, 1963

3,112,716
FIRE STARTER FOR OUTSIDE GRILLS
Edward Moore Knight, Johnson Park,
Holly Springs, Miss.
Filed Dec. 1, 1960, Ser. No. 73,091
2 Claims. (Cl. 110—1)

This invention relates to temperature modification of a character to change the physical characteristics of commodities, including those used for human consumption, and to equipment on the order of outside grills utilizing fuel such as charcoal or the like by which such temperature modification may be accomplished.

The invention relates especially to the manner of starting or initiating the burning of the charcoal or other fuel to be used in the grilling of foods and prior to the cooking operation in order to obtain sufficient fire to supply the necessary heat for the intended cooking.

Grills have been used extensively about the home and elsewhere for the cooking of various foods including hamburgers, frankfurters, steaks, chops, chickens and the like, but one of the difficulties or problems encountered has been the starting of the charcoal fire. The burning of hickory wood to produce charcoal requires a great amount of time. Consequently, charcoal briquettes have been produced and widely used. Various means have been undertaken to obtain rapid ignition of the same, including the application of volatile hydrocarbon fluid which sometimes resulted in damage to property and persons, including death. Electrical types of starters have been used but these also have been slow and unsatisfactory.

The starting of charcoal fires has been accomplished by the igniting of paper or other combustible material beneath the charcoal, dumping the ignited charcoal and gradually applying additional charcoal thereto. Also devices have been produced for supporting the charcoal so that fire could be built therebeneath to ignite the same, however these devices have been complicated, expensive, unreliable and otherwise unsatisfactory.

It is an object of the invention to provide a fire starter for charcoal by means of which the charcoal can be readily supported, paper or other combustible material can be ignited beneath the same, and a draft produced to cause the free burning of the paper or other combustible material to cause the charcoal to be readily ignited.

Another object of the invention is to provide a fire starter for charcoal in which the charcoal is supported in an elevated position to be readily ignited by the burning of paper or other readily combustible material therebeneath and in which the support for the charcoal is composed of multiple independent sections which can be readily withdrawn one at a time or simultaneously to allow the charcoal to be dropped to a position to supply heat for grilling.

A further object of the invention is to provide a generally frusto-conical fire starter of multiple lengths of metal which can be readily fastened together to provide a hollow tapered sleeve with an opening or door in one side of its larger end through which combustible material may be applied and with such sleeve having equally spaced openings in opposite sides, one set of openings registering with the other and adapted to removably receive the legs of independent U-shaped members constructed to support charcoal and which members may be removed individually or collectively.

Another object of the invention is to provide a fire starter for charcoal, such starter being in the form of a generally frusto-conical sleeve adapted to be supported on its larger end, with a transverse opening and end portion for the introduction of paper or other highly combustible material, and with a series of circumferentially spaced openings around such larger end for the admission of air to support combustion when the paper or highly combustible material is ignited, and with such sleeve having equally spaced transverse rod receiving apertures and a series of multiple rod members for supporting charcoal above such circumferentially openings, and which rods can be individually removed for controlling the dumping of the charcoal after it is ignited.

Other objects and advantages of the invention will be apparent from the following description taken in conjunction with the accompanying drawing wherein:

FIG. 1 is a perspective illustrating one application of the invention;
FIG. 2, an enlarged section on the line 2—2 of FIG. 1;
FIG. 3, an enlarged section on the line 3—3 of FIG. 1;
FIG. 4, a plan view of one-half of the device of FIG. 1 in flat condition; and
FIG. 5, a plan view of the device of FIG. 1 illustrating both halves of the device in flat condition.

Briefly stated, the fire starter for charcoal of the present invention comprises a relatively thin tapered pipe or sleeve adapted to be stood on its larger end and with such end portion provided with a transverse opening for the introduction of paper to be ignited with openings circumferentially spaced at substantially the same height as the first opening so that the ignited paper can receive air through the additional openings and the sleeve acting as a chimney with means for supporting charcoal and spaced above the portion where paper will be ignited so that the charcoal may receive heat from the burning paper and with such support being in the form of individual members with multiple rods which may be received in multiple positions in such openings and by means of which the dropping of charcoal can be controlled.

With continued reference to the drawings, a grill 10 suitable for use outdoors is supported on legs 11. Within this grill charcoal or other similar fuel is adapted to be burned to provide heat for cooking and other purposes.

In order to start the fire or ignite the charcoal, a fire starter is provided in the form of a sleeve 12 of sheet metal or other non-combustible material composed of a pair of sections 13 and 14 as illustrated in FIGS. 1–4, or a single section 15 as illustrated in FIG. 5.

The sections 13 and 14 may have their adjoining edges provided with interlocking portions, the section 13 having an outwardly and reversely bent joint portion 16 and an inwardly and reversely bent portion 17, while the section 14 may have an outwardly and reversely bet portion 18 and an inwardly and reversely bent portion 19.

Where the sleeve is formed of a single section 15 as illustrated in FIG. 5, it will have but a single longitudinal joint instead of the two joints as illustrated in FIG. 3. These joints may be flattened or not as desired. Also when the sleeve is composed of two lengths or longitudinal portions, these lengths may be flat as illustrated in FIG. 4 or when the sleeve is assembled it may have reinforcing portions 20 and 21 at its smaller end and similar portions 22 and 23 at its larger end.

The two sections 13 and 14 of the sleeve may have portions 24 and 25 of reduced length as illustrated in FIGS. 1 to 4 or in a simple section as illustrated in FIG. 5. Said opening 26 or 26' being for the introduction of paper or the like or other readily combustible material to be burned to cause the ignition of charcoal.

The sleeve sections 13 and 14 are provided with circular openings 27 and 28 circumferentially spaced around the lower or larger end portion of the sleeve for the admission of oxygen containing air for supporting combustion.

Each of the sections 13 and 14 of the sleeve is provided with a row of equally spaced openings, such rows being generally parallel to the plane of the larger end of the sleeve and with the row of openings 29, in the section 13, in the same position as the openings 30, in the section 14, so that cross rods as, for example, a series of U-shaped members 31 may be employed, the legs of such U-shaped members being parallel and spaced according to the spacing of the openings 29 and 30 so that such U-shaped members may be located in any two openings in each side of the sleeve.

In the use of the device with the parts in the position shown in FIGS. 1 and 2 charcoal may be placed upon the series of U-shaped members 31 and paper may be placed beneath such members through the opening 26 and ignited. Air will be admitted through the openings 27 and 28 to support combustion and the heat will heat and ignite the charcoal, whereupon the charcoal may be dumped into the grill 10 either little by little or all at one time. The advantage of thus being able to control the discharge of ignited charcoal into the grill 10, is that after only a portion of the ignited charcoal is thus discharged and the rods replaced, additional charcoal may be fed through the chimney, and ignited by the heat of the ignited charcoal remaining on the rods. By repeating this operation, a bed of burning charcoal, of the desired amount, may be accumulated in the grill.

Another advantage of the two-tined U-shaped member is the ease of insertion in the openings in the sleeve over a member containing three or more tines.

If desired, the sections 13 and 14 which form the frusto-conical sleeve may have openings 32 and 33 by either of which the device may be hung on a nail.

The single sheet 15 of FIG. 5 has integral sections 13' and 14', and opening 26' and air inlets 27', 28', the grill openings 29' and 30' and the suspension openings 32' and 33' corresponding to those of the preceding figures.

It will be understood from the foregoing that a relatively simple, inexpensive, and practical device is provided which can be readily applied to a charcoal grill for starting the fire and which can be readily removed after the fire has been started and which can be repeatedly used as desired.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A charcoal starter comprising a chimney-forming tapered sleeve adapted to be stood on the larger end (with such end forming the bottom and the other end forming the top) said sleeve having circumferentially spaced openings near the larger end, one of said openings being larger than the other for the introduction of paper or other readily ignitible material into said sleeve, to be fired to ignite charcoal, said sleeve to be provided with another series of openings in a plane parallel to the top of said sleeve and generally centrally located between the top and bottom of said sleeve, said openings to be spaced and in registration to receive U-shaped members, and a series of U-shaped members the legs of which are parallel and spaced according to the last aforementioned series of openings in order to fit into and be supported by the openings, and with other like members providing a combined support for a mass of charcoal to be ignited, and by the individual removal of said U-shaped members the amount of charcoal released can be controlled.

2. The structure of claim 1 in which said sleeve is composed of multiple sections with contiguous edges connected.

References Cited in the file of this patent

UNITED STATES PATENTS

| | | |
|---|---|---|
| 92,779 | Benns | July 20, 1869 |
| 1,959,473 | Heron | May 22, 1934 |
| 1,991,802 | Holub | Feb. 19, 1935 |
| 2,920,614 | Phelps | Jan. 12, 1960 |

FOREIGN PATENTS

| | | |
|---|---|---|
| 205,682 | Great Britain | Oct. 25, 1923 |